United States Patent [19]
Dabis

[11] 3,869,548

[45] Mar. 4, 1975

[54] MEDICAMENT FOR THE TREATMENT OF DISORDERS OF THE EYE

[75] Inventor: Georges Dabis, Bordeaux, France

[73] Assignee: Societe d'Etudes Et D'Exploitation de Marques et Brevets-S.E.M.S., Asnieres, France

[22] Filed: Jan. 22, 1968

[21] Appl. No.: 699,293

[30] Foreign Application Priority Data
Jan. 26, 1967 France .......................... 67.92655

[52] U.S. Cl. .................................. 424/94, 424/98
[51] Int. Cl. .................. A61k 17/18, A61k 19/00
[58] Field of Search ............................ 424/98, 94

[56] References Cited
UNITED STATES PATENTS

| | | | |
|---|---|---|---|
| 1,995,038 | 5/1935 | Peck ........................... | 424/98 |
| 2,120,680 | 6/1938 | Rosenfeld et al. ............ | 424/98 X |
| 2,995,493 | 8/1961 | Douglas et al. .............. | 424/94 X |
| 3,281,331 | 10/1966 | Bergkrist ...................... | 424/94 X |

OTHER PUBLICATIONS

Hospital Formulary 5/1966, Volume I, Section 20:12.04, pp. 1–10 (thereof).

Webb; Enzymes 2/1959, pp. 43-55 and 667, QP601 D5E.

*Primary Examiner*—Albert T. Meyers
*Assistant Examiner*—Dale R. Ore
*Attorney, Agent, or Firm*—Karl F. Ross; Herbert Dubno

[57] ABSTRACT

Method of and medicament for the treatment of disorders of the eye, namely, diabetic retinopathy and degenerative maculation of the eye wherein doses containing heparin in combination with detoxified enzymes obtained from the venom of snakes, especially the Brazilian vipers Bothrops Jararaca and Lachesis Atrox, is administered, each dose containing 2000 to 2500 I.U. of heparin in accordance with the French Pharmacopoeia and 1 to 2 coagulation units (K) of the enzyme. The composition is administered parenterally.

3 Claims, No Drawings

MEDICAMENT FOR THE TREATMENT OF DISORDERS OF THE EYE

My present invention relates to the treatment of mammalian disorders of the eye and to a new composition or medicament for this purpose.

The object of this invention is to provide an improved medicament for parenteral administration to mammalia to alleviate disorders of the eye as well as a method of making this medicament.

I have found that a composition for surprisingly effective treatment of mammalian disorders of the eye and especially human diabetic retinopathy and degenerative maculation of the eye is formed by combining heparin with a detoxified enzyme component obtained from snake venom, especially the venom of Brazilian vipers of the class of Bothrops Jararaca and Lachesis Atrox.

More particularly, I have found that it is possible to form an enzymatic product from the venom of these vipers which can effectively be combined with heparin so as to be substantially specific to the aforementioned eye disorders, while being practically incapable of causing disfunction of any other organism or otherwise showing undesirable side effects. The heparin, according to this invention, corresponds to the standards established by the FRENCH PHARMACOPOEIA, 1965 edition, page 559, and the units in which heparin is measured are the International Units (I.U.) as determined in accordance with the technique described in the CODEX. The enzymatic product of this invention is preferably produced by initially desiccating the venom obtained from Bothrops Jararaca or Lachesis Atrox and thereafter dissolving the venom powder in water. This solution is subjected first to precipitation with ammonium sulfate and then to precipitation with magnesium sulfate to produce an enxymatically active first fraction and an enzymatically toxic second fraction, these fractions being recovered by successive filtrations. The two precipitates can then be purified by dialysis, the toxic second fraction detoxified by subjecting it to ultraviolet light, and the two fractions mixed to give a product whose activity is constant and well defined. This product, whose activity is measured in terms of coagulation (units K), can be admixed with heparin as previously described.

The coagulation unit (unit K) describes the coagulating power of the enzymatic substance and is defined as the quantity of the product which coagulates 5 ml of fresh horse blood decalcified by the addition of 0.3% sodium oxalate or citrate thereto in the period of 10 minutes at a temperature of 20° to 22°C, in vitro.

According to a more specific feature of this invention, the enzymatically active product obtained from the snake venom, is mixed with the heparin in proportions such that there are 2000 to 2500 Internal Units (I.U.) of heparin per 1 to 2 coagulation units (K) of the enzymatically active product. Preferably, each dose for parenteral injection contains 2500 I.U. of heparin and 1 coagulation unit of the enzymatically active product in a vehicle, generally sterile distilled water, suitable for such parenteral administration.

After mixing, the composition may be subjected to lyophilization in the presence of dextran which serves as a stabilizer. The lyophilized and stabilized product is conditioned under nitrogen in a sterile atmosphere and is sealed into single-doze ampulses. Immediately prior to use, the ampules are opened and the composition dissolved in sterile distilled water just before use by parenteral administration.

EXAMPLE

The highly toxic venom obtained from a Bothrops Jararaca and the venom obtained from a Lachesis Atrox were both treated as follows:

Each sample of the two venom was dried with heat to completion to obtain a dry venom powder. This powder was dissolved in a quantity of distilled water just above that required for complete dissolution. Crystals of ammonium sulfate $(Na_4)_2SO_4$ were then gradually dissolved in the solution until precipitation ceased and the solution permitted to stand for 8 to 10 hours prior to filtration; an enzymatically active coagulating first precipitate (Fraction I) was recovered on the filter. The filtrate was then saturated with magnesium sulfate and, after 24 hours of stand, a second fraction precipitated. The second precipitate (Fraction II), found to be enzymatically active and toxic, was recovered by filtration.

The coagulant (Fraction I) and the toxic (Fraction II) precipitates are washed separately in distilled water and placed in respective cells of a dialysis purifier. The precipitates are subjected to dialytic purification in distilled water, changed twice daily in the usual manner and after about 6 days the conductivity is measured; when conductivity falls below $10^{-4}$ mho (reciprocal ohms), purification is considered complete. The toxic fraction II is then placed in a petri dish at a thickness of 1 cm or less and exposed for one-half hour to the light of the quartz lamp. The two fractions are then combined and to the mixture is added a quantity of sodium chloride to bring the final concentration of the salt to 0.9%. A quantity of phenol is supplied to bring the final concentration of this substance to 0.3%. After the mixture is permitted to stand for 12 hours in ambient temperature, it is filtered through paper. In the manner described, the horse blood is added to tubes containing aliquots of the enzyme product and the coagulation units (K) calculated by the time required for coagulation. The toxicity is tested as described below. The mixture is diluted with 0.3% phenolic physiological serum so that each dose of 5 ml contains 1 unit (K) of the enzymatic product.

One to two units K of this mixture of purified enzymes were required with 2000 to 2500 I.U. of heparin prepared as provided in the French Pharmacopoeia (Pharmacope Francaise), 1965 edition, page 559. The doses are filtered and diluted or lyophilized in the presence of dextran, under a sterile atmosphere of nitrogen; thereafter the doses are packaged in ampules containing 1 coagulation unit of the enzymatic product and 2500 I.U. of heparin. In the following discussion it should be understood that the ampules are opened only immediately prior to use and the contents dissolved in sterile distilled water to form an aqueous solution suitable for parenteral administration.

Another method of determining the coagulation factor consists in preparing a solution of bovine fibrinogen in three parts per 1000 of distilled water. To this solution, maintained in a controlled-temperature bath at about 25°C, is added 1 ml of the enzyme solution prior to dilution. Coagulation should be total in less than 1 minute and, upon dilution of the enzyme by 50%, the coagulation time is no more than 3 minutes. Here, too, the coagulation unit (K) can be determined in a convenient manner.

To ascertain whether the enzymatic product remains toxic after detoxification as provided earlier, adult pigeons weighing 300 to 350 g are administered successive doses of the enzymatic solution of 1.5, 1.8 and 2 ml; one should not observe any indication of toxicity with the 1.5 ml dose if the enzymatic product has been sufficiently detoxified.

The toxicity and effectiveness of the product was then tested as follows:

Acute Toxicity

The lyophilized stabilized mixture prepared as described above was administered to mice upon dissolution of a quantity of the mixture equivalent to 1 coagulation unit (K) per ml of water, in doses of 1 coagulation unit (K). Attempts to determine the $DL_{50}$ value were futile because the $DL_{50}$ value was found to be very feeble. When 10 coagulation units of the product are injected (after dissolution in 1 ml of water), the $DL_{50}$ is equivalent to 120 – 150 units K per kg of animal weight. No toxic reaction was observed however in the smaller dose.

When the dose corresponding to 1.5 coagulation units per kg of body weight was injected subcutaneously into cats, no toxic reaction was manifested. In tests with guinea pigs no toxic reaction was observed after injections of doses corresponding to 15 coagulation units per kg of body weight.

Chronic Toxicity

Tests were carried out on a number of cats concurrently, with parallel tests serving as a control. The chronic toxicity test involved the injection of 1.5 coagulation units per kg of body weight daily into a number of the test animals for a period of a month. The test animals were sacrificed and studied. No histopathological changes were observed nor was there any sign of intravascular coagulation in the brain, marrow, lungs, heart, liver, spleen, pancreas, kidney or suprarenal. No hemorrhaging was found. The weight increase of the test animals approximated the weight increase of the control group.

Anaphylactic Tests

Guinea pigs were given intraperitoneal injections twice weekly with doses of the product corresponding to 0.1 coagulation unit and, at the end of the third week, with a final injection of a dose corresponding to 0.2 coagulation unit K. None of the animals so treated showed anaphylactic symptoms.

Tests as to the effectiveness of the medicament on humans in the first stage of diabetic retinopathy, as discussed in greater detail below, show 70–80% complete remission and 15–30% partial remission with, however, reduction of the development of the condition and stabilization of its evolution.

It has been recognized that one of the most difficult problems arising in diabetes is diabetic retinopathy. This problem, which has hitherto confounded the medical field because of the conflict between attempts to rectify metabolic instability simultaneously with the treatments of vascular problems, cannot effectively be cured by any known conventional technique. It is with this in mind that I have discovered, surprisingly, that by associating heparin with detoxified enzymes obtained from viper venom, it is possible to produce total remission, partial remission or alleviation of the condition as sketched above. It appears that heparin plays here its well-known role in breaking down large molecules and also an antiexudative role. Furthermore, it appears, with repeated treatment for extended periods, to lower to a surprisingly extent the blood viscosity in the critical areas. The detoxified enzymes, processed as indicated earlier, are characterized by hemostatic activity without modification of the prothrombin rate or time without danger of hypercoagulation and thus without the risk of secondary thrombosis, and without any apparent influence upon the viscosity of the blood. The detoxified enzyme component remains active in the presence of normal hemostasis as well as in environments subject to hemostasis problems. This component also appears to be effective to modify plateletic function without increasing the number of plaquettes by liberation of the activators of hemostasis. In the treatment of retinopathy, this component checks erythroblastic diapedesis and is effective upon capillary permeability. It has been found that neither heparin alone nor the enzyme component alone is capable of ameliorating diabetic retinopathy and degenerative maculation of the eye. However, when the two components are combined, the product is surprisingly effective in ameliorating diabetic retinopathy and collateral defects through at least the early stages of the disorder and even to the penultimate stage. Thus, the two components together have a synergistic and symbiotic relationship not foreseeable from the known effects of either. It will be understood further that, while the treatment with the improved pharmaceutical reduces microaneurisms and the development of aneurism, as a general rule, even though the disorder is ameliorated or its development halted, the microaneurism remains as a residue of the disorder.

Treatment of human bodies is effected by intravenous and intramuscular injection of one or two doses daily of the product, each dose preferably containing 2000 to 2500 I.U. of heparin and 1 to 2 coagulation units of the enzyme. Injections may be carried out weekly or fortnightly and intramuscularly to retain the retinogressive state of the illness once the treatment has caused amelioration.

While it has been found that the rate of recovery and the degree of recovery of the treatment of human patients suffering diabetic retinopathy and degenerative maculation of the eye varies with the degree to which the disease has progressed and with the constancy of treatment, the following summary may be made:

When treatment is carried out in the first stage of the disorder characterized in terms of vascular lesions by a primitive segmental dilation of the veinules and, in terms of exudative lesions of little, if any, exudation, without retinal edema or change in the appearance of the spots (macula), it is found that 70 to 80% of the cases manifest complete remission while 15 to 30% show a partial remission with stabilization of the disorder, i.e. termination of development.

The second stage of the disorder is characterized, in terms of vascular lesions, by microaneurisms in an irregular distribution but predominantly in the posterior pole; from the viewpoint of exudation lesions, the second stage is characterized by punctuated exudation of the posterior pole.

In the third stage, the disorder is characterized, in terms of vascular lesions, by slight hemorrhage and microthrombosis and, from the viewpoint of exudative lesions, by more significant exudation. In the second and third stages, the percentage of total remission and partial remission or stabilization remain approximately the same.

In the fourth stage, the disorder is characterized, in terms of vascular lesions, by an irregular dilation of the large venous trunks and retinal hemorrhaging; in terms of exudative lesions, it is characterized by very significant exudation. When patients in the stage of the illness are treated with the product of the present invention, 50% of the cases manifest amelioration of which 30% represent recovery or healing and 20% represent partial remission or stabilization.

In the fifth stage of the disorder, prolific retinitis and a highly extended exudation characterize the disorder. Upon treatment of patients in this stage, in accordance with the present invention, 15% show amelioration and stabilization.

In the sixth stage, characterized by detachment of the retina by nerve traction and, from the viewpoint of exudative lesions, of degeneration of the region, practically no amelioration occurs upon treatment in accordance with the present invention.

It has been found that treatment of humans is best carried out with doses containing from 1 to 2 coagulation units of the enzymatically effective component and 2000 to 2500 I.U. of heparin per dose. When the dose contains one coagulation unit of the enzymatically effective unit and 2500 I.U. heparin, as is preferred, one or two such ampules may be administered at each daily treatment. Treatment may be daily, weekly or fortnightly, as previously indicated. When the medicament has been lyophilized and put up in ampules as presently described, the contents of each ampule is dissolved in sterile distilled water immediately prior to administration intramuscularly or intravenously. It is, however, also possible to make use of venous perfusion in which case the vehicle is a solvent commonly employed for such administration which may act as a diffuser and modifier of vascular permeability.

I claim:

1. A method of treating the human eye disorders of diabetic retinopathy and degenerative maculation of the eye, comprising the step of administering by means of injection to the human a composition containing heparin and a detoxified enzyme obtained from venom of a Brazilian viper selected from the group consisting of Bothrops Jararaca and Lachesis Atrox in a dosage of 2000 to 2500 International Units of heparin in accordance with the French Pharmacopoeia and 1 to 2 coagulation units of the enzyme until the disorder is ameliorated, the detoxified enzyme being obtained by desiccating the venom to form a venom powder, dissolving the venom powder in distilled water to form a solution, adding ammonium sulfate crystals to said solution to precipitate an enzymatically active first fraction, recovering said enzymatically active first fraction from the solution by filtration, precipitating from the filtrate by addition of magnesium sulfate thereto to form an enzymatically toxic second fraction, purifying the fractions by dialysis, detoxifying the second fraction by exposing it to the light of a quartz lamp, mixing the fractions to obtain an enzymatically active product of constant and definitive activity, and mixing said product with heparin.

2. A medicament for the treatment of the human eye disorders diabetic retinopathy and degenerative maculation which consists essentially of heparin and a detoxified enzyme obtained from venom of a Brazilian viper selected from the group consisting of Bothrops Jararaca and Lachesis Atrox in a dosage of 2000 to 2500 International Units of heparin in accordance with the French Pharmacopoeia and 1 to 2 coagulation units of the enzyme, the detoxified enzyme being obtained by desiccating the venom to form a venom powder, dissolving the venom powder in distilled water to form a solution, adding ammonium sulate crystals to said solution to precipitate an enzymatically active first fraction, recovering said enzymatic first fraction from the solution by filtration, precipitating from the filtrate by addition of magnesium sulfate thereto to form an enzymatically toxic second fraction, purifying the fractions by dialysis, detoxifying the second fraction by exposing it to the light of a quartz lamp, mixing the fractions to obtain an enzymatically active product of constant and definitive activity, and mixing said product with heparin.

3. A method of making a medicament, comprisisng the steps of obtaining a venom from a Brazilian viper selected from the group consisting of Bothrops Jararaca and Lachesis Atrox, desiccating the venom to form a venom powder, dissolving the venom powder in distilled water to form a solution adding ammonium sulfate crystals to said solution to precipitate an enzymatically active first fraction, recovering said enzymatic first fraction from the solution by filtration, precipitating from the filtrate by addition of magnesium sulfate thereto to form an enzymatically toxic second fraction, purifying the fractions by dialysis, detoxifying the second fraction by exposing it to the light of a quartz lamp, mixing the fractions to obtain an enzymatically active product of constant and definitive activity, and mixing said product with heparin in a proportion of about 1 to 2 coagulation units (K) of the product per 2000 to 2500 I.U. of heparin.

* * * * *